United States Patent
Tominaga et al.

(10) Patent No.: US 6,336,115 B1
(45) Date of Patent: *Jan. 1, 2002

(54) FILE SHARING SYSTEM IN A CLIENT/SERVER ENVIRONMENT WITH EFFICIENT FILE CONTROL USING A WWW-BROWSER-FUNCTION EXTENSION UNIT

(75) Inventors: Hiroyuki Tominaga; Norimichi Hiroshige, both of Fukuoka (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,957

(22) Filed: Dec. 18, 1997

(30) Foreign Application Priority Data

Jun. 17, 1997 (JP) .............................. 9-160203

(51) Int. Cl.[7] .............................. G06F 17/30
(52) U.S. Cl. .................. 707/10; 707/8; 707/1; 709/203
(58) Field of Search .......................... 707/8, 10, 1, 200, 707/513; 709/203, 227, 250

(56) References Cited

U.S. PATENT DOCUMENTS

| | | | | |
|---|---|---|---|---|
| 5,642,515 A | * | 6/1997 | Jones et al. | 709/227 |
| 5,649,186 A | * | 7/1997 | Ferguson | 707/10 |
| 5,710,918 A | * | 1/1998 | Legarde et al. | 707/10 |
| 5,752,246 A | * | 5/1998 | Rogers et al. | 707/10 |
| 5,826,253 A | * | 10/1998 | Bredenberg | 707/2 |
| 5,857,187 A | * | 1/1999 | Uenoyama et al. | 707/8 |
| 5,894,555 A | * | 4/1999 | Harada et al. | 709/213 |
| 5,935,249 A | * | 8/1999 | Stern et al. | 713/201 |
| 6,018,747 A | * | 1/2000 | Burns et al. | 707/203 |
| 6,023,698 A | * | 2/2000 | Lavey, Jr. et al. | 707/10 |
| 6,029,175 A | * | 2/2000 | Chow et al. | 707/104 |
| 6,085,120 A | * | 7/2000 | Schwerdtfeger et al. | 700/90 |

OTHER PUBLICATIONS

Jaworski et al., JAVA 1.1 Developer's Guide, Sams.net Publishing, p. 4–10, 124–131,331–341, Jan. 1997.*

* cited by examiner

Primary Examiner—Jean R. Homere
Assistant Examiner—Greta L. Robinson
(74) Attorney, Agent, or Firm—Rosenman & Colin, LLP

(57) ABSTRACT

A file sharing system implemented on a system having a server system and a plurality of client systems connected to the server system via a network. The file sharing system includes a WWW server provided in the server system, a first storage unit provided in the server system and storing files, a WWW-server-function extension unit provided in the server system and operating in association with the WWW server to control the files based on file identifiers. The file sharing system further includes a WWW browser provided in a client system which is one of the client systems and receiving one of the files and a corresponding file identifier from the server device, a second storage unit provided in the client system and storing the one of the files, a WWW-browser-function extension unit provided in the client system and operating in association with the WWW browser to activate an application to update the one of the files and to send an updated file and the corresponding file identifier to the server system.

8 Claims, 8 Drawing Sheets

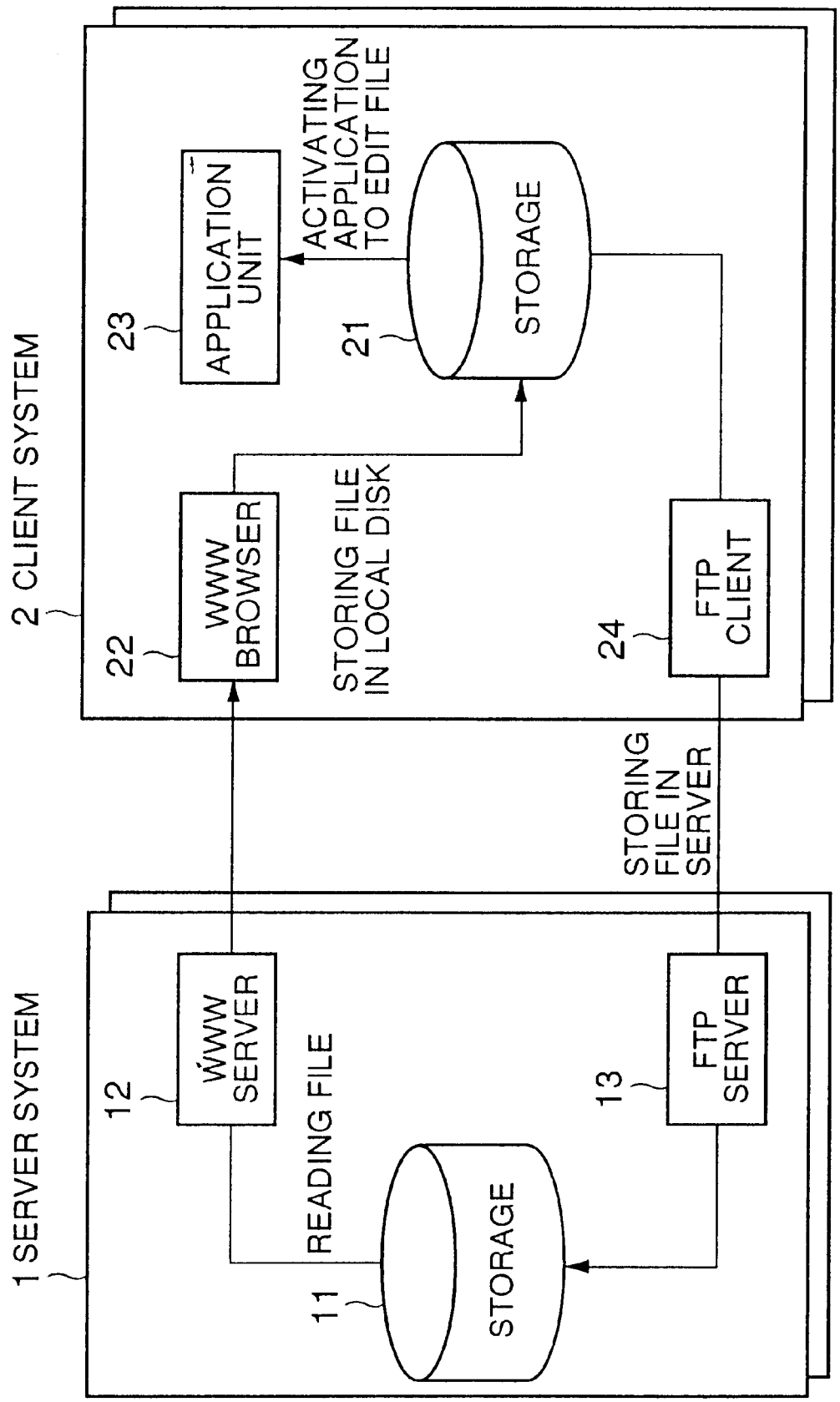

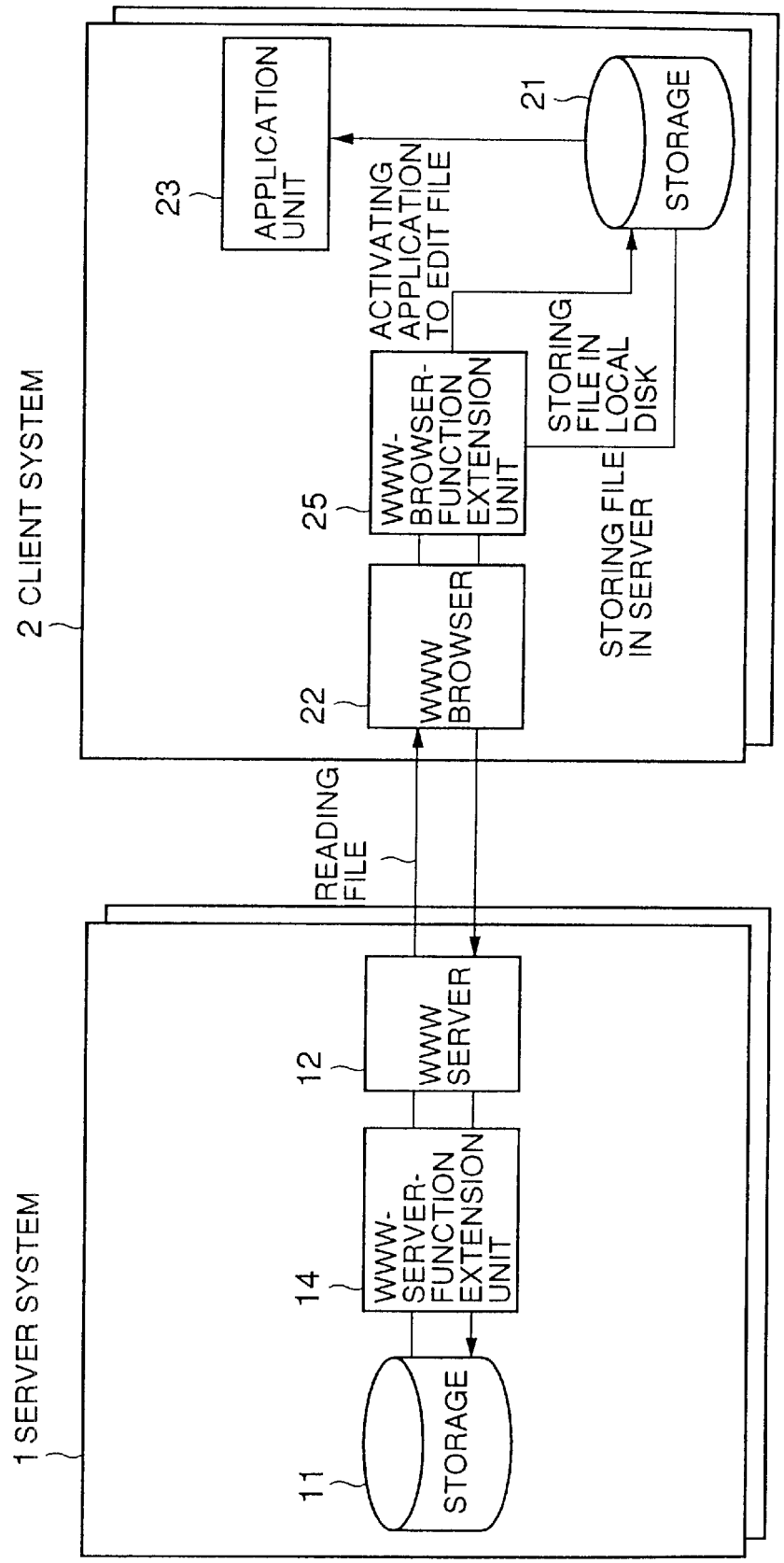

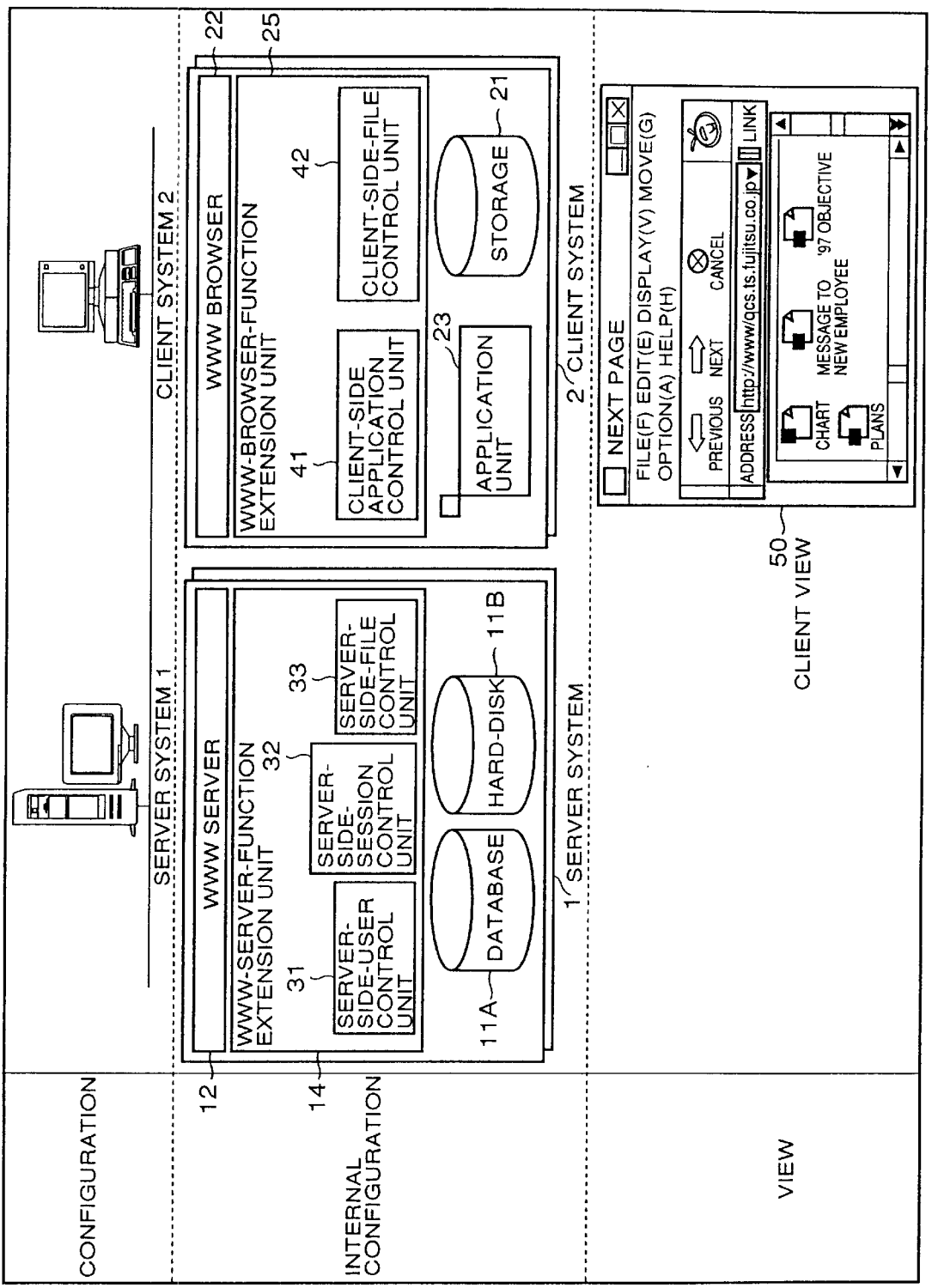

FIG. 5A

| FILE TABLE 60 | | |
|---|---|---|
| IDENTIFIER | FILE NAME | LOCK FLAG |
| 1 | file-A | Unlock |
| 2 | file-B | Lock |
| ⋮ | ⋮ | ⋮ |

FIG. 5B

| SESSION TABLE | |
|---|---|
| SESSION ID | USER IDENTIFIER |
| 1 | 2 |
| 2 | 1 |
| ⋮ | ⋮ |

FIG. 5C

| USER TABLE | |
|---|---|
| USER IDENTIFIER | USER NAME |
| 1 | UserA |
| 2 | UserB |
| ⋮ | ⋮ |

FILE SHARING SYSTEM IN A CLIENT/SERVER ENVIRONMENT WITH EFFICIENT FILE CONTROL USING A WWW-BROWSER-FUNCTION EXTENSION UNIT

BACKGROUND OF THE INVENTION

1. Field of the Invention

The present invention generally relates to file sharing systems, and particularly relates to a file sharing system which uses file-identification information to control files based on WWW (world wide web).

2. Description of the Related Art

A wide availability of computer networks in recent years has prompted a large number of businesses to introduce a built-in-OS-type file sharing system or a client-server-type file sharing system. The client-server-type file sharing system allows communication to be conducted between programs even when programs such as server-application programs and client-application programs are created independently from each other.

Against this background, the WWW has made significant progress in terms of the number of users because of its advantages such as superior operability and harmonized view (form of display). The WWW is a distributed data system, and is suitable for handling characters, audio information, image information, etc., based on HTML (hyper text markup language). In the WWW, pieces of information contributed by different computers can be connected with each other via a direct hyper link, so that users can trace information among inter-linked pieces of information even when these pieces of information are stored in different computers. The WWW use HTTP as a communication protocol between a server system and client systems. In such a configuration as described above, there is a demand for a file sharing system based on the WWW.

FIG. 1 is an illustrative drawing of a schematic configuration of a related-art system.

The system of FIG. 1 includes a server system 1 and client systems 2 connected to the server system 1 via a network 3. The network 3 is a LAN (local area network), a WAN (wide area network), or the like. The server system 1 provides services for the client systems 2 via the network 3. The client systems 2 are provided with an aim of integrating workstations or the like in a network, so that the server system 1 and the client systems 2 play their respective part in a cooperative manner to handle business processing, which used can be carried out by a mainframe-centered system.

FIG. 2 is a block diagram of an example of the related art system.

In FIG. 2, the same elements as those of FIG. 1 are referred to by the same numerals, and a description thereof will be omitted. In FIG. 2, the network 3 is omitted.

The server system 1 includes a storage 11 for storing files, a WWW server 12 for reading files from the storage 11 and sending the files to the client system 2, and a FTP server 13 for receiving information from the client system 2 and storing the information in the storage 11. Here, the FTP (file transfer protocol) is a protocol used for a file exchange between host machines on a TCP/IP-based network.

The client system 2 includes a storage 21, a WWW browser 22, a application unit 23, and a FTP client 24. The WWW browser 22 receives files from the WWW server 12. The storage 21 stores the files received by the WWW browser 22. The application unit 23 reads files stored in the storage 21, and executes an application to edit the files. The FTP client 24 reads updated files from the storage 21, and sends the updated files to the server system 1.

In the system described above, when the client system 2 sends a request for file transfer to the server system 1, the WWW server 12 reads a pertinent file from the storage 11, and sends the file to the client system 2. In the client system 2, the WWW browser 22 receives the file, and stores it in the storage 21.

The application unit 23 reads the file from the storage 21, and, then, executes an application to edit the file. The edited (updated) file is stored in the storage 21 again. The FTP client 24 reads the updated file from the storage 21, and transfers the file to the server system 1. The FTP server 13 receives the updated file before storing the file in the storage 11.

In the WWW system described above, a file in the WWW server 12 can be transferred to the client system 2 when the WWW browser 22 of the client system 2 indicates the file by using URL (uniform resource locator, e.g., "abcdef.co.jp/Document /word.doc"), and, then, an application corresponding to the file is used for editing the file and storing the file in the storage 21.

However, no specific function is provided to send back the edited file to the WWW server 12 by using HTML (a program language for displaying the WWW browser), Java language, or the like in the WWW browser 22. Since such a specific function is not provided, an OS-built-in function or an application having an FTP function is used as an alternative to send the file from the client system 2 executing the WWW browser 22 to the server system 1 executing the WWW server 12.

As described above, the related-art system has a drawback in that file transfers on one way and on the way back between the server system 1 and the client system 2 are carried out by different transfer functions when a site of the WWW browser 22 needs to share a file with a site of the WWW server 12. Because of this drawback, while operating the client system, a user needs to keep a mental note of a location in the client system where the file received from the WWW server 12 is located, a name of the file, and, in some cases, a name of the file on the side of the server system.

Accordingly, there is a need for a user-friendly file sharing system which offers harmonized operation and harmonized display based on the WWW browser, and allows a client system to store a file in a server after receiving the file from the server without a user needing to keep a mental note of a client-side name, a client-side location, and a server-side name of the file.

SUMMARY OF THE INVENTION

Accordingly, it is a general object of the present invention to provide a file sharing system which can satisfy the need described above.

It is another and more specific object of the present invention to provide a user-friendly file sharing system which offers harmonized operation and harmonized display based on the WWW browser, and allows a client system to store a file in a server after receiving the file from the server without a user needing to keep a mental note about a client-side name, a client-side location, and a server-side name of the file.

In order to achieve the above objects according to the present invention, a file sharing system, implemented on a system having a server system and a plurality of client systems connected to said server system via a network, includes a WWW server provided in said server system, a first storage unit provided in said server system and storing files, a WWW-server-function extension unit provided in said server system and operating in association with said WWW server to control said files based on file identifiers. The file sharing system further includes a WWW browser provided in a client system which is one of said client systems and receiving one of said files and a corresponding file identifier from said server device, a second storage unit provided in said client system and storing said one of said files, a WWW-browser-function extension unit provided in said client system and operating in association with said WWW browser to activate an application to update said one of said files and to send an updated file and said corresponding file identifier to said server system.

In the file sharing system described above, when a user operates the WWW browser of the client system to bring a file from the server system to the client system, WWW-browser-function extension unit activates a relevant application to edit the file, and, upon a completion of the file editing, transfers the updated file to the server system. Further, since the file and the updated file are transferred along with the corresponding file identifier, the corresponding file identifier is shared by both the server system and the client system, providing a means of file identification. In this configuration, therefore, the user can update the file without keeping a mental note of a file name and a file location.

Other objects and further features of the present invention will be apparent from the following detailed description when read in conjunction with the accompanying drawings.

BRIEF DESCRIPTION OF THE DRAWINGS

FIG. 2 is a block diagram of an example of the related art system;

FIG. 3 is a block diagram of a file sharing system according to the principle of the present invention;

FIG. 4 is an illustrative drawing showing an embodiment of a file sharing system according to the present invention;

FIGS. 5A through 5C are illustrative drawings showing examples of various tables stored in a database of FIG. 4;

DESCRIPTION OF THE PREFERRED EMBODIMENTS

In the following, a principle and an embodiment of the present invention will be described with reference to the accompanying drawings.

FIG. 3 is a block diagram of a file sharing system according to the principle of the present invention. In FIG. 3, the same elements as those of FIG. 2 are referred to by the same numerals, and a description thereof will be omitted.

Figure 1:
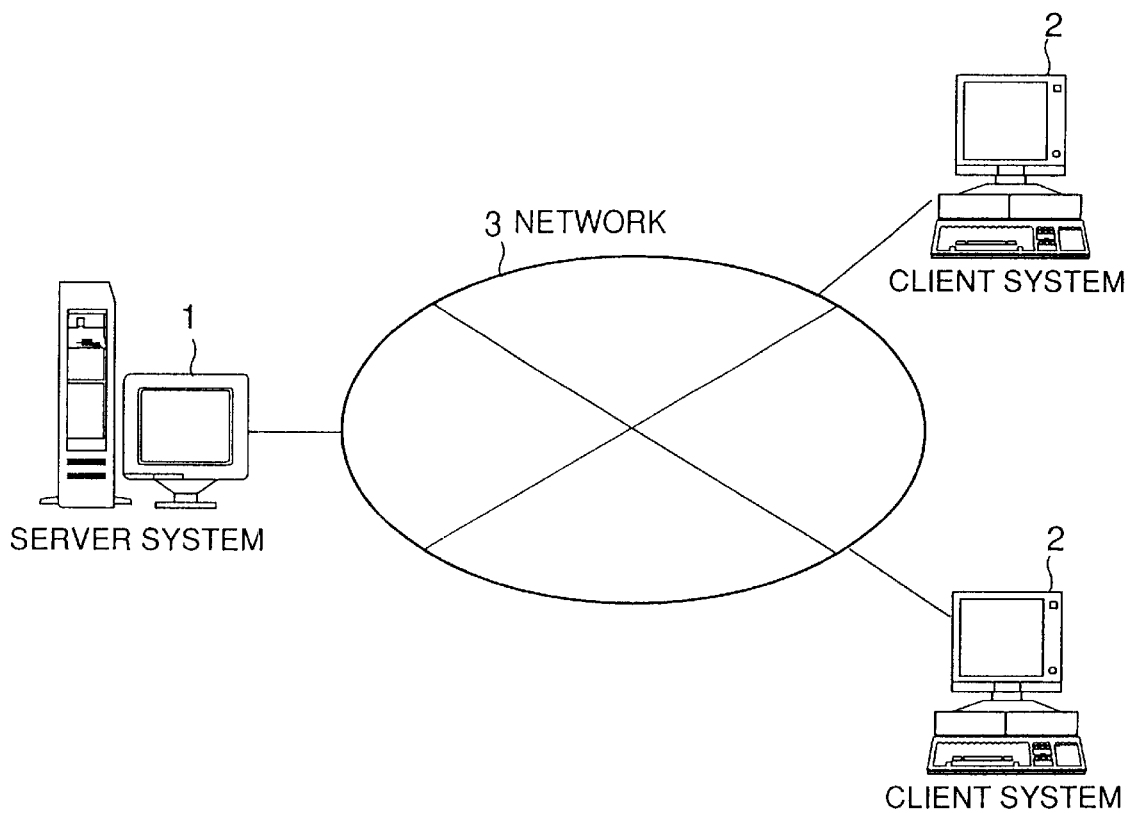
FIG. 1 is an illustrative drawing of a schematic configuration of a related-art system.

The file sharing system of FIG. 3 includes the server system 1 and the client system 2 connected with each other via a network such as a LAN or a VAN. In FIG. 3, only one client system 2 is shown for sake of simplicity of explanation. In practice, however, a plurality of client systems 2 are connected to the server system 1 via the network as shown in FIG. 1.

The server system 1 includes the storage 11 for storing files, the WWW server 12, and a WWW-server-function extension unit 14 operating in association with the WWW server 12.

The client systems 2 includes the WWW browser 22, a WWW-browser-function extension unit 25 operating in conjunction with the WWW browser 22, the application unit 23 for editing files controlled by the WWW-browser-function extension unit 25, and the storage 21 for storing files handled by the WWW-browser-function extension unit 25.

In this configuration of the present invention, when the client system 2 issues a request for file transfer, the WWW-server-function extension unit 14 of the server system 1 reads a file from the storage 11, and sends the file to the client system 2. In the client system 2, the WWW browser 22 receives the file, which is then stored in the storage 21. The WWW-browser-function extension unit 25 activates the application unit 23 to edit the file stored in the storage 21. The edited (updated) file is then transferred back to the server system 1 by the WWW-browser-function extension unit 25 via the WWW browser 22. In the server system 1, the WWW-server-function extension unit 14 stores the updated file in the storage 11.

In this configuration, a user operates a WWW-browser view of the client system 2 to bring a file from the server system 1 to the client system 2 and to activate a relevant application to edit the file, and, upon a completion of the file editing, the WWW-browser-function extension unit 25 transfers the updated file to the server system 1.

Further, the WWW-server-function extension unit 14 of the server system 1 includes a server-side-user control unit for controlling information on server-side users, a server-side-session control unit for controlling server-side sessions, and a server-side-file control unit for controlling server-side files.

The WWW-browser-function extension unit 25 of the client system 2 includes a client-side-application control unit for controlling client applications and a client-side-file control unit for controlling client-side files.

By using these units listed in the above, the WWW-server-function extension unit 14 of the server system 1 and the WWW-browser-function extension unit 25 of the client system 2 achieves a smooth file transfer between the server system 1 and the client system 2, as will be described later in detail.

Further, the storage 11 of the server system 1 stores a file table including a list of file identifiers, file names, and lock flags which are matched together, a session table showing a list of pairs matching session IDs with user identifiers, and a user table containing a list of pairs matching the user identifiers with user names. These tables are used when the server-side files are updated.

By using these tables in the server system 1, transfer of updated files from the client system 2 to the server system 1 can be reliably carried out, as will be described later in detail.

Further, when exchanging information between the server system 1 and the client system 2, a user operating the client system 2 sends a login-request message from the client system 2 to the server system 1. In response, the WWW-server-function extension unit 14 of the server system 1 searches in the user table to obtain a user identifier of the user, and searches in the session table for the user identifier to obtain a session ID. The session ID is then sent to the client system 2. In the client system 2, the WWW-browser-function extension unit 25 sends a file-listing request and the received session ID to the server system 1. The server system 1 identifies the session by using the session ID, and the server-side-file control unit accesses the storage 11 to generate a listing of files, which is then sent to the client system 2. After these processes, a client view is created on the client side. Through the client view, various processes such as a a new-file registering process, a file updating process, and a file removing process are carried out.

In this manner, communications between the server system 1 and the client system 2 are readily carried out according to the present invention.

Further, when updating a file stored in the storage 11 of the server system 1, the client system 2 sends a file-update request, the received session ID, and a file identifier to the server system 1. In response, the server system 1 uses the server-side-session control unit to check the session ID, and the server-side-file control unit searches for a file indicated by the file identifier in the file table. If an access condition is satisfactory, the file is read from the storage 11, and is transferred to the client system 2. Upon an arrival of the file in the client system 2, the client-side-application control unit activates a relevant application to edit the file. When the file editing is finished, the client-side-application control unit notifies the client-side-file control unit of the completion of the file editing. The client-side-file control unit then reads the updated file, and sends the session ID, a file-overwrite request, the file identifier, and the file to the server system 1.

This configuration allows the file updating process to be readily performed.

Further, when a new file needs to be registered, the client-side-file control unit reads a file that the user wishes to register, and sends the file along with the session ID and a new-file-registration request to the server system 1. After the server-side-session control unit checks the session ID, the server-side-file control unit stores the received file in the storage 11, and records a new file identifier and a new file name in the file table stored in the storage 11. After all of these operations, the new file identifier is reported back to the server system 1.

This configuration allows the new-file registering process to be readily performed.

Moreover, when a file in the server system 1 needs to be removed, the client system 2 transmits the session ID, a file-removal request, and a file identifier to the server system 1. On the side of the server system 1, a file indicated by the file identifier is removed. A removal-OK message is then sent to the client system 2.

This configuration enables the file removing process to be readily carried out.

In what follows, an embodiment of the present invention will be described with reference to the accompanying drawings.

First, operations of the file sharing system of the present invention will be briefly described with reference to FIG. 3. In the present invention, the WWW browser 22, the WWW-browser-function extension unit 25, the WWW server 12, and the WWW-server-function extension unit 14 together control file identifiers assigned to respective files, and updates files under the control of the WWW-server-function extension unit 14, as will be described in the following.

A user operating the WWW browser 22 sends an updating request based on a file identifier (an ID for indicating a file) to the WWW-server-function extension unit 14. In response, the WWW-server-function extension unit 14 sends an indicated file to the WWW-browser-function extension unit 25.

Upon receiving the file, the WWW-browser-function extension unit 25 stores the file in the storage 21.

Further, the WWW-browser-function extension unit 25 activates the application unit 23 corresponding to the received file so as to edit the file. When the file editing is completed, a notice of completion is issued.

Upon detecting the completion of an operation of the application unit 23, the WWW-browser-function extension unit 25 reads the updated file from the storage 21, and sends the file to the WWW-server-function extension unit 14 along with the file identifier.

In this manner, file updating of a file stored in the server system 1 is performed through simple user operations. When there is a need to store a new file, a file is read from the storage 21 of the client system 2, and is transferred to the WWW-server-function extension unit 14 along with a request for new registration.

When there is a need to remove a file, a file identifier along with a request for file deletion is sent from the WWW-browser-function extension unit 25 to the WWW-server-function extension unit 14.

FIG. 4 is an illustrative drawing showing an embodiment of the file sharing system according to the present invention. In FIG. 4, the same elements as those of FIG. 3 are referred to by the same numerals.

The server system 1 includes the WWW server 12, the WWW-server-function extension unit 14, a database 11a and a hard-disk 11b serving as the storage 11.

The WWW server 12 is used for transferring a file to the client system 2. The WWW-server-function extension unit 14 is used for reading a file from the storage 11, and for writing an updated file in the storage 11. The database 11a stores various tables and file information, and the hard-disk 11b stores files. The WWW-server-function extension unit 14 includes a server-side-user control unit 31 for controlling information on server-side users, a server-side-session control unit 32 for controlling server-side sessions, and a server-side-file control unit 33 for controlling server-side files.

The client system 2 includes the WWW browser 22, the WWW-browser-function extension unit 25, the application unit 23 for executing applications, and the storage (hard-disk) 21 for storing files. The WWW browser 22 establishes a connection with the server system 1, and is used for file exchange with the server system 1. The WWW-browser-function extension unit 25 is used for reading an updated file from the storage 21, and for sending it to the server system 1. The WWW-browser-function extension unit 25 includes a client-side-application control unit 41 for controlling client applications and a client-side-file control unit 42 for controlling client-side files. In FIG. 4, a client view 50 on the client side is shown.

FIGS. 5A through 5C are illustrative drawings showing examples of various tables stored in the database 11a. FIG. 5A shows a file table 60 for recording file information, which includes file identifiers 61, file names 62, and lock flags 63. The file identifiers 61 are ID numbers used for identifying files. The lock flags 63 are provided in order to prevent access requests from colliding with each other when access is attempted by a plurality of client systems at the same time. The lock flags 63 are locked when corresponding files are being accessed. When there is no access, the lock flags 63 are unlocked.

FIG. 5B shows a session table 70 for controlling session information, which includes session IDs 71 and user identifiers 72. FIG. 5C shows a user table 80 for controlling user information, which includes the user identifiers 72 and user names 81. In the following, operations of the system having these tables will be described.

Figure 6:
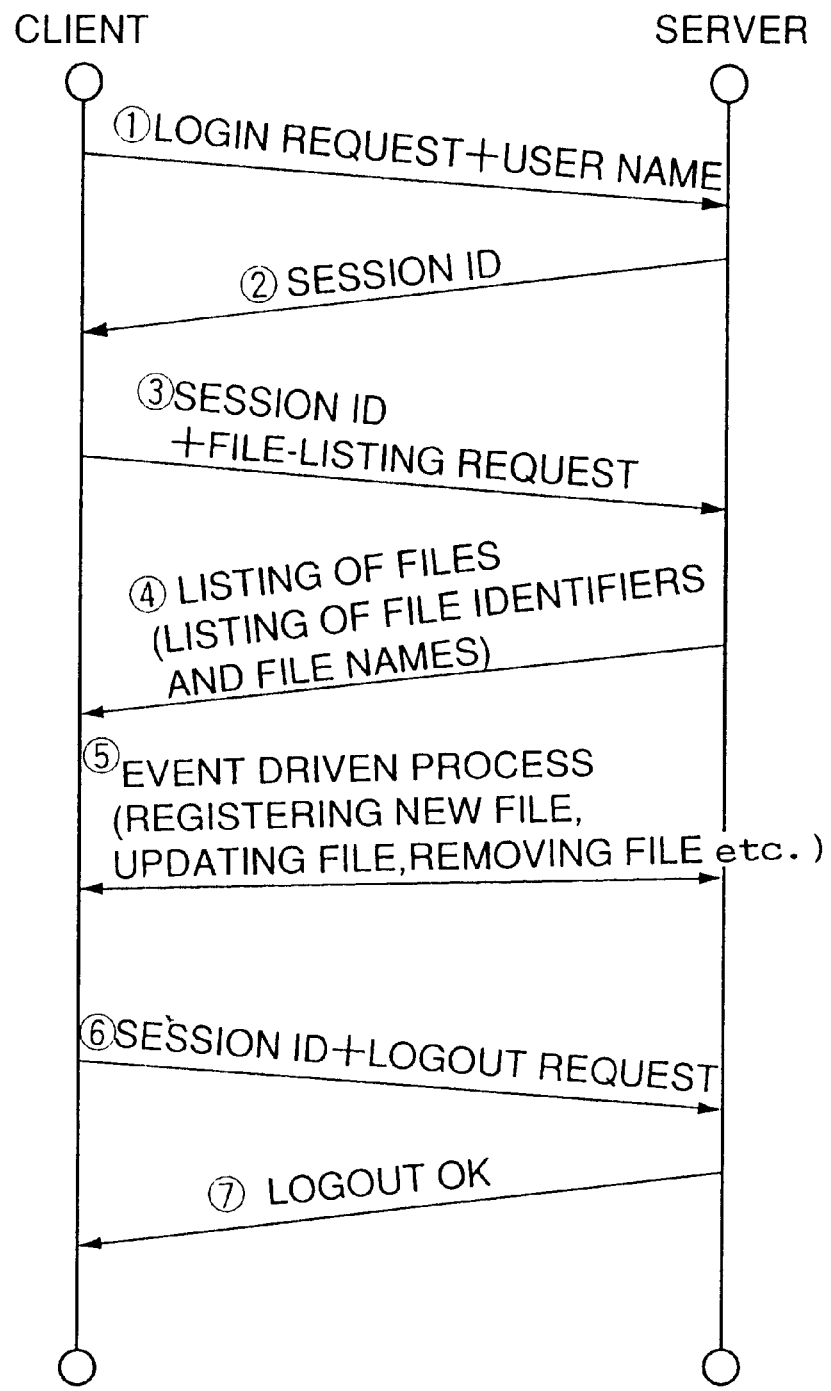
FIG. 6 is a sequence chart showing a flow of message exchanges according to the present invention.

FIG. 6 is a sequence chart showing a flow of message exchanges according to the present invention. This sequence chart illustrates exchanges between the server system and the client system.

In FIG. 6, a login request is sent from the client system to the server system through a user operation. A user name is also transferred along with the login request in order to identify the user.

Upon receiving the login request, the server-side-user control unit 31 search for the user name in the user table 80 to obtain a corresponding user identifier, and, then, starts a session. Upon a start of the session, the server-side-session control unit 32 searches for the user identifier in the session table 70, and obtains a session ID corresponding to the user identifier. The obtained session ID is transferred from the server system to the client system. The session is established when the server-side-session control unit 32 records the user identifier and the session ID in the session table 70.

The client system sends a file-listing request to the server system along with the received session ID in order to create the client view 50.

The server-side-session control unit 32 of the server system distinguishes the session by using the session ID, and the server-side-file control unit 33 searches in the database 11a for the file table 60, and generates a listing of files (a listing of file identifiers and file names) based on the file table 60. The listing of files is then transferred to the client system.

The process described above results in the client view 50 being created. User operations on the client view 50 then initiate various processes such as registering a new file, updating a file, and removing a file, which are even-driven processes between the server system 1 and the client system 2 as shown in FIG. 6. Message flows of these processes will be described later in detail.

When loging out, the client system sends a logout request and the session ID to the server system.

In response, the server-side-session control unit 32 of the server system removes the session indicated by the received session ID from the session table 70, thereby finishing the session. The server-side-session control unit 32 then transmits a logout-OK message to the client system.

According to the configuration of the embodiment, as described above, communication between the server system and the client system is readily conducted at a high speed in an efficient manner.

Since the server system 1 is provided with the file table 60, the session table 70, and the user table 80, a file updated in the client system 2 is reliably sent back to the server system 1.

In what follows, a file updating process, a new-file registering process, and a file removing process which are event-driven processes shown in FIG. 6 will be described.

Figure 7:
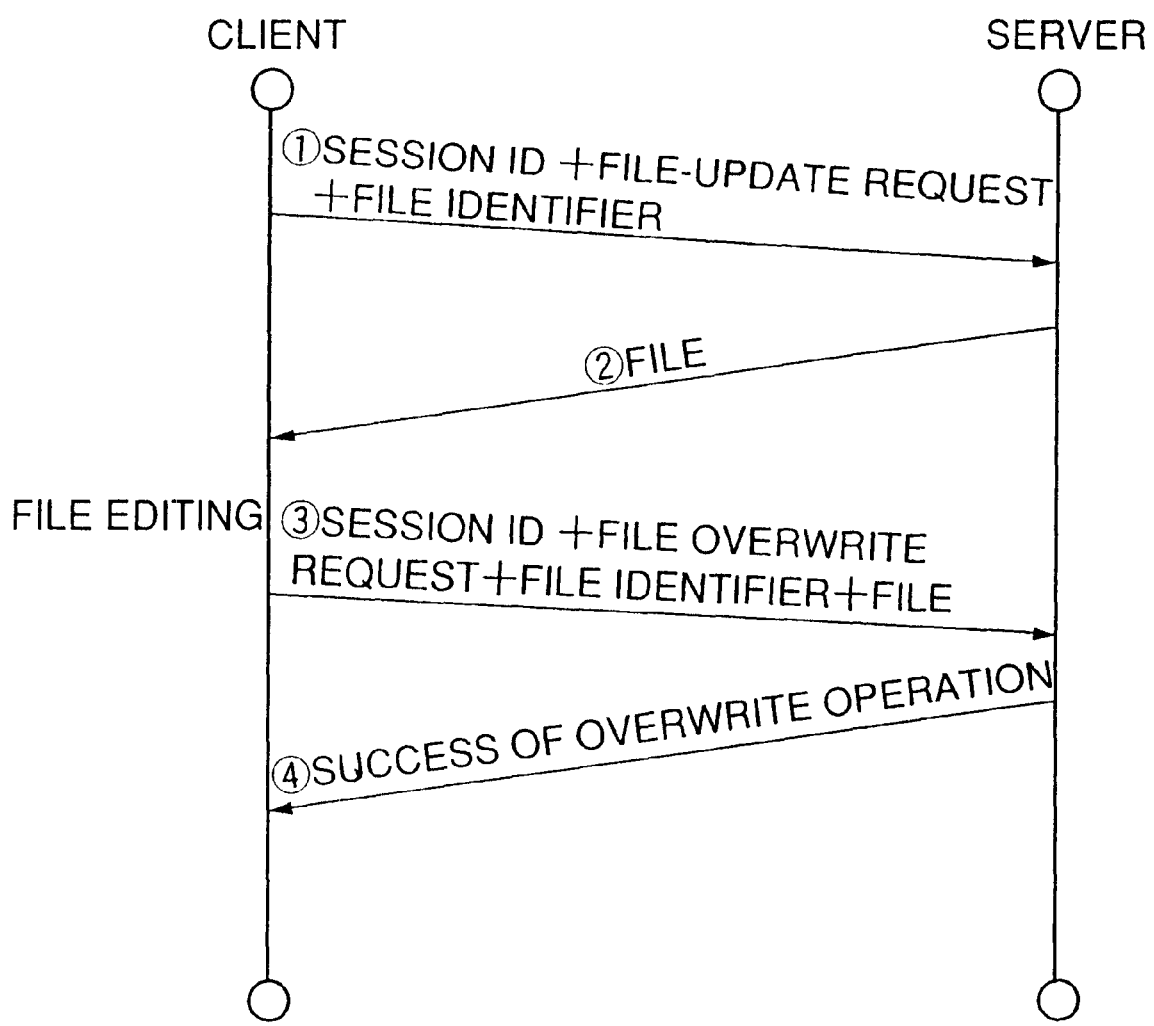
FIG. 7 is a sequence chart showing a flow of message exchanges with regard to a file updating process.

FIG. 7 is a sequence chart showing a flow of message exchanges with regard to the file updating process.

A file updating process is initiated when the client system sends a file-update request, the received session ID, and a file identifier to the server system.

When the server system receives the request, the server-side-session control unit 32 checks the session ID, and the server-side-file control unit 33 checks a lock flag in the file table 60 corresponding to a file which is indicated by the file identifier. If the file has been already locked, a message is sent to the client system, rejecting the file-update request. If the file is not locked, the lock flag is set to a lock status, and the indicated file is read from the hard-disk 11b to be transferred to the client system.

Upon receiving the file, the client-side-file control unit 42 of the client system stores the file in the storage 21. The client-side-application control unit 41 activates an application of the application unit 23 corresponding to the file, and the file is handed to the application unit 23.

The user edits the file. When the user finishes the application, the client-side-application control unit 41 of the client system notifies the client-side-file control unit 42 of the completion of the application. At this time, the edited file is stored in the storage 21. The client-side-file control unit 42 reads the updated (edited) file from the storage 21, and sends the session ID, a file-overwrite request, the file identifier, and the updated file.

The server-side-session control unit 32 of the server system checks the session ID, and the server-side-file control unit 33 replaces a file in the hard-disk 11b with the received file when the two files have the same file identifier. After the replacement, a completion of the process (a success of the overwrite operation) is sent to notify the client system.

In this manner, the file updating process is readily performed.

Figure 8:
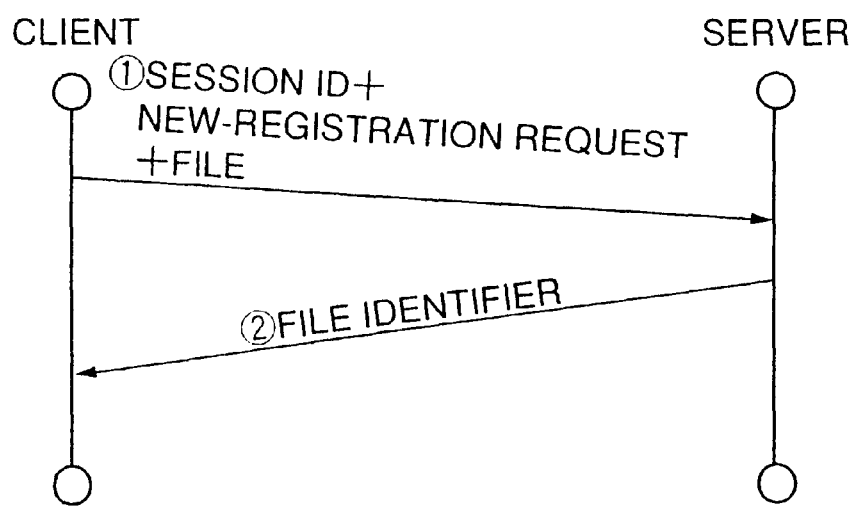
FIG. 8 is a sequence chart showing a flow of message exchanges with regard to a new-file registering process.

FIG. 8 is a sequence chart showing a flow of message exchanges with regard to the new-file registering process.

The client-side-file control unit 42 of the client system reads a file from the storage 21 when the user wishes to register this file as a new file, and sends the file to the server system along with the session ID and a new-registration request.

After the server-side-session control unit 32 of the server system checks the session ID, the server-side-file control unit 33 stores the received file in the hard-disk 11b. Further, the server-side-file control unit 33 registers a new file identifier and a new file name in the file table 60 of the database 11a, and sends the new file identifier to the client system.

In this manner, the new-file registering process is readily performed.

Figure 9:
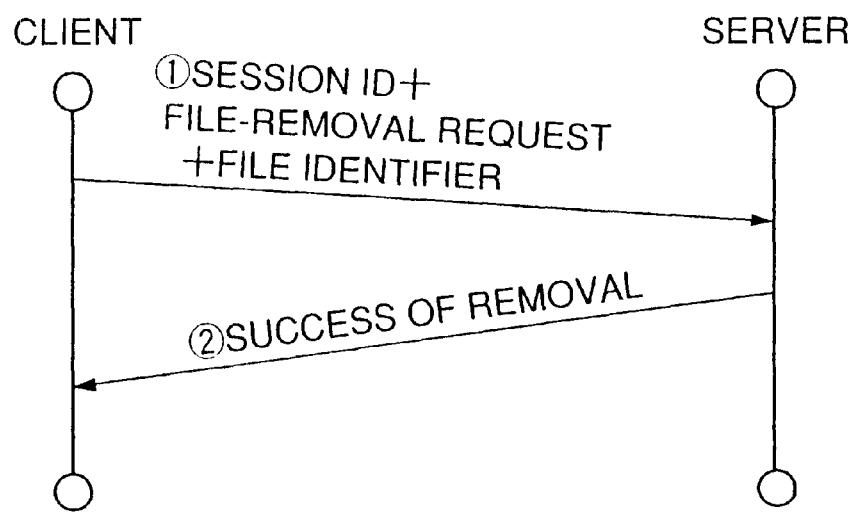
FIG. 9 is a sequence chart showing a flow of message exchanges with regard to a file removing process.

FIG. 9 is a sequence chart showing a flow of message exchanges with regard to the file removing process.

The client system sends a file identifier of a file that the user wishes to delete, the session ID, and a file-removal request to the server system.

The server-side-session control unit 32 of the server system checks the session ID, and the server-side-file control unit 33 deletes file information in the database 11a which corresponds to the file identifier received from the client system. After the deletion, the client system is notified of a completion of the removal process.

In this manner, the file removing process is readily performed.

In the above embodiment, a protocol for communication between the server system and the client system is implemented based on programs, and so are the control processes of the systems. To this end, each of the server system and the client system is provided with a memory medium which stores programs for the communication protocol and the control processes. The programs stored in the memory medium can be modified as it becomes necessary, so that a partial change in the communication protocol, for example, can be made simply by modifying the programs. The memory medium for storing the programs may be provided in a package form so that an exchange of packages attains easy and speedy program modification.

The present invention having advantages as described above enhances operability of networks such as the Internet and Intranet. That is, a user does not have to keep a mental note of a client-side file name, a client-side file location (directory), and a server-side file name when the user uses the WWW browser of a client system to retrieve a file from a server and store the file in the server again. Harmonized operation and harmonized display of the WWW browser allows the user to enjoy a user-friendly file sharing system.

Further, the present invention is not limited to these embodiments, but various variations and modifications may be made without departing from the scope of the present invention.

We claim:

1. A file sharing system implemented on a system having a server system and a plurality of client systems connected to said server system via a network, said file sharing system comprising:
   a WWW server provided in said server system;
   a first storage unit, provided in said server system, storing files;
   a WWW-server-function extension unit, provided in said server system, operating in association with said WWW server to control said files based on respective file identifiers indicating said files;
   a WWW browser, provided in a client system which is one of said client systems, receiving one of said files and a corresponding one of the file identifiers indicating said one of said files from said server system;
   a second storage unit, provided in said client system, storing said one of said files;
   a WWW-browser-function extension unit, provided in said client system, operating in association with said WWW browser to activate an application to update said one of said files and to send the updated file and said corresponding one of the file identifiers to said server system, resulting in said updated file being stored in said first storage unit in said server system as a file having the same file identifier as said corresponding one of the file identifiers.

2. The file sharing system as claimed in claim 1, wherein said WWW-server-function extension unit comprises a server-side-user control unit for controlling information on server-side users, a server-side-session control unit for controlling server-side sessions, and a server-side-file control unit for controlling server-side files, and said WWW-browser-function extension unit comprises a client-side-application control unit for controlling client applications and a client-side-file control unit for controlling client-side files.

3. The file sharing system as claimed in claim 2, wherein said first storage unit includes a file table including a list of file identifiers, file names, and lock flags, a session table including a list of session IDs and user identifiers, and a user table including a list of said user identifiers and user names.

4. The file sharing system as claimed in claim 3, wherein when said client system used by a user transmits a login request to said server system, said WWW-server-function extension unit searches in said user table to obtain a user identifier of said user, and searches in said session table to obtain a session ID corresponding to said user identifier before sending said session ID to said client system, said WWW-browser-function extension unit of said client system receiving said session ID from said server system and then sending said session ID and a file-listing request to said server system, said server system receiving said session ID and said file-listing request from said client system and identifying a session by checking said session ID before said server-side-file control unit accesses said first storage unit to generate a listing of files which is then sent to said client system, said client system creating a client view based on said listing of files, said client view being used for performing a new-file registering process, a file updating process, and a file removing process.

5. The file sharing system as claimed in claim 4, wherein when said client system transmits said session ID, a file-update request, and a file identifier to said server system, said server-side-session control unit checks said session ID to identify said session, and said server-side-file control unit searches for said file identifier in said file table to check if a predetermined access condition is satisfied before reading a file indicated by said file identifier from said first storage unit and sending said file to said client system when said predetermined access condition is met, said client system receiving said file and using said client-side-application control unit to activate an application for updating said file, said client-side-application control unit notifying said client-side-file control unit of a completion of file updating when said application stops operating, said client-side-file control unit receiving said notice and then sending an updated file, said session ID, said file identifier, and a file-overwrite request to said server system.

6. The file sharing system as claimed in claim 4, wherein when said client system transmits a new file, said session ID, and a new-file-registration request to said server system, said server-side-session control unit checks said session ID to identify said session, and said server-side-file control unit stores said new file in said first storage unit while recording a new file identifier and a new file name in said file table and sending said new file identifier to said client system.

7. The file sharing system as claimed in claim 4, wherein when said client system transmits said session ID, a file identifier, and a file-removal request to said server system, said server system deletes a file of said file identifier and sends a removal-OK message to said client system.

8. A machine readable medium having a program embodied therein for controlling a system having a server system and a plurality of client systems connected to said server system via a network, said program comprising:
   WWW-server-function-extension program code means, implemented in said server system and operating in association with a WWW server, for controlling files stored in said server system based on respective file identifiers indicative of the files and sending one of said files and a corresponding file identifier indicative of said one of said files to one of said client systems; and
   WWW-browser-function-extension program code means, implemented in said server system and operating in association with a WWW browser, for activating an application to update said one of said files and to send the updated file and said corresponding file identifier to said server system, wherein said WWW-server-function-extension program code means stores the updated file in said server system as a file having the same file identifier as said corresponding file identifier.

* * * * *